(12) United States Patent
Saitoh et al.

(10) Patent No.: US 10,585,223 B2
(45) Date of Patent: Mar. 10, 2020

(54) DEPOLARIZING FILM, DEPOLARIZING MEMBER, AND METHOD FOR PRODUCING DEPOLARIZING FILM

(71) Applicant: FUJIFILM Corporation, Tokyo (JP)

(72) Inventors: Yukito Saitoh, Kanagawa (JP);
Daisuke Kashiwagi, Kanagawa (JP);
Ayako Muramatsu, Kanagawa (JP);
Yujiro Yanai, Kanagawa (JP); Hideki Kaneiwa, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 16/546,872

(22) Filed: Aug. 21, 2019

(65) Prior Publication Data

US 2019/0377117 A1 Dec. 12, 2019

Related U.S. Application Data

(63) Continuation of application No. PCT/JP2018/000513, filed on Jan. 11, 2018.

(30) Foreign Application Priority Data

Feb. 24, 2017 (JP) .................................. 2017-033681

(51) Int. Cl.
*G02B 5/30* (2006.01)
(52) U.S. Cl.
CPC ................. *G02B 5/3016* (2013.01)
(58) Field of Classification Search
CPC .................................................. G02B 5/3016
See application file for complete search history.

(56) References Cited

U.S. PATENT DOCUMENTS

| | | | |
|---|---|---|---|
| 6,046,849 A * | 4/2000 | Moseley | G02B 5/3016 |
| | | | 359/465 |
| 6,072,566 A | 6/2000 | Fujii et al. | |
| 6,188,451 B1 | 2/2001 | Fujii et al. | |
| 2006/0023165 A1 | 2/2006 | Ishihara et al. | |
| 2011/0285956 A1 | 11/2011 | Akao et al. | |

FOREIGN PATENT DOCUMENTS

| | | |
|---|---|---|
| JP | H09-113862 A | 5/1997 |
| JP | H10-090675 A | 4/1998 |
| JP | 2001-066429 A | 3/2001 |

(Continued)

OTHER PUBLICATIONS

International Search Report issued in PCT/JP2018/000513 dated Mar. 20, 2018.

(Continued)

*Primary Examiner* — Wen Huang
(74) *Attorney, Agent, or Firm* — Edwards Neils LLC; Jean C. Edwards, Esq.

(57) ABSTRACT

Provided is a depolarizing film including a depolarizing layer composed of a first region and a second region having differing optical characteristics, wherein in the depolarizing layer, the ratio between the area of the first region and the area of the second region is 0.45:0.55 to 0.55:0.45, the first region is an optically anisotropic region causing 90° optical rotation of light that is incident on one surface of the depolarizing layer before the light is emitted from the other surface, and the second region is an optically isotropic region having optical isotropy.

3 Claims, 8 Drawing Sheets

(56) References Cited

FOREIGN PATENT DOCUMENTS

| | | |
|---|---|---|
| JP | 2004-133179 A | 4/2004 |
| JP | 2006-047421 A | 2/2006 |
| JP | 2008-226405 A | 9/2008 |
| JP | 2010-181473 A | 8/2010 |
| JP | 2013-130810 A | 7/2013 |
| WO | 2018/016549 A1 | 1/2018 |

OTHER PUBLICATIONS

Witten Opinion issued in PCT/JP2018/000513 dated Mar. 20, 2018.
International Preliminary Report on Patentability issued by WIPO dated Aug. 27, 2019 in connection with International Patent Application No. PCT/JP2018/000513.

* cited by examiner

DEPOLARIZING FILM, DEPOLARIZING MEMBER, AND METHOD FOR PRODUCING DEPOLARIZING FILM

CROSS-REFERENCE TO RELATED APPLICATIONS

This application is a continuation application of International Application No. PCT/JP2018/000513, filed Jan. 11, 2018, which was published under Article 21(2) in Japanese, and which claims priority under 35 U.S.C. § 119(a) to Japanese Patent Application No. 2017-033681, filed Feb. 24, 2017. The above applications are hereby expressly incorporated by reference, in their entirety, into the present application.

BACKGROUND OF THE INVENTION

1. Field of the Invention

The present invention relates to a depolarizing film that eliminates polarizability of an incident ray of light, a depolarizing member, and a method for producing a depolarizing film.

2. Description of the Related Art

For the purpose of suppressing coloration that makes the polarization of a display surface polarizing plate isotropic, eliminating the polarization-dependency of a sensor, reducing speckle noise in an image projection device that projects an image on a screen using laser light, or the like, depolarizing elements are used. In regard to conventional depolarizing elements, as a method for depolarization of the elements, a method of disposing a plurality of birefringent materials in a plane such that the slow axes are oriented in a plurality of directions is generally used.

For example, in JP2006-47421A, a depolarizing element having a stripe-shaped or checker-shaped planar pattern in which a region provided with a ½ wavelength plate (λ/2 plate) and a region provided with a simple transmission member that does not give a phase difference are alternately disposed in a plane of light incidence for the purpose of reducing speckle noise is disclosed.

However, in the case of a configuration including a first region and a second region as described above, in a case in which the inclination between the optical axis (slow axis) of the λ/2 plate and the polarizing axis of incident linearly polarized light is 45° (or −45), an effect of depolarization can be obtained. However, in a case in which the polarizing axis of incident light is not 45° (or −45°), there is a problem that an effect of depolarization does not occur.

Furthermore, according to the depolarizing element of JP2006-47421A, in view of the characteristics of the λ/2 plate, there is a problem that high depolarizability can be obtained only at particular wavelengths.

As a configuration that solves this problem and enables realization of depolarization for light in a wide range of wavelength, or depolarization irrespective of the direction of the polarizing axis of incident linearly polarized light, a depolarizing element having a configuration in which a first birefringent material layer and a second birefringent medium layer are laminated, and two birefringent medium layers each include two or more regions having different directions of the fast axis, has been suggested in JP2013-130810A.

SUMMARY OF THE INVENTION

However, as in the case of the depolarizing element of JP2013-130810A, in order to form regions having different directions of the fast axis within one layer, complicated control of orientation is required, and therefore, there is a problem that productivity may be low. Furthermore, since the direction of orientation becomes unstable in a boundary region between regions having different directions of the fast axis, there is a problem that definition enhancement is difficult.

In view of such circumstances, it is an object in the invention to provide a depolarizing film and a depolarizing member, which enable satisfactory depolarization independently of the wavelength of an incident ray or the direction of the polarizing axis, and provide high productivity with a simple configuration. It is another object in the invention to provide a production method by which a depolarizing film capable of depolarization independently of the wavelength of an incident ray can be produced easily.

The depolarizing film in the invention is a depolarizing film including a depolarizing layer composed of a first region and a second region having differing optical characteristics, wherein a ratio between the area of the first region and the area of the second region in each depolarizing layer is 0.45:0.55 to 0.55:0.45, the first region is an optically anisotropic region that causes 90° optical rotation of light incident on one surface of the depolarizing layer before the light is emitted from another surface, and the second region is an optically isotropic region having optical isotropy.

It is preferable for the depolarizing film in the invention that the first region is formed by immobilizing a liquid crystalline phase oriented with a 90° twist between one surface and the other surface of the depolarizing layer.

In regard to the depolarizing film in the invention, it is preferable that in a case in which the first region is formed from a liquid crystalline phase, the second region is formed from an isotropic phase formed by the same liquid crystal material as the liquid crystal material constituting the first region.

It is preferable that the depolarizing film in the invention is formed by laminating a λ/4 plate on one surface or the other surface of the depolarizing layer.

A depolarizing member in the invention includes a depolarizing film including a depolarizing layer; and a depolarizing film including a depolarizing layer and further including a λ/4 plate, the two depolarizing films being disposed such that the two depolarizing layers face each other with the λ/4 plate interposed therebetween.

A method for producing a depolarizing film in the invention comprises:

a coating step of evenly applying a polymerizable liquid crystal composition including a polymerizable liquid crystal compound having a cationic polymerizable group and a photoradical polymerizable group, a chiral agent, and a cationic polymerization initiator on a support and forming a coating film;

an aging step of orienting the liquid crystal compound into a twisted liquid crystalline phase within the coating film;

an ultraviolet curing step including: a full-face exposure step of irradiating the entire surface of the coating film after the aging step with ultraviolet radiation, thereby causing a photocationic polymerization reaction, and partially curing the coating film to produce a semi-fixed liquid crystal film; an initiator application step of applying an initiator supply solution including a photoradical polymerization initiator on the surface of the semi-fixed liquid crystal film; and a mask exposure step of irradiating the semi-fixed liquid crystal film with ultraviolet radiation through a mask having a non-opening part and an opening part at an area ratio of 0.45:0.55 to 0.55:0.45 in a state in which the mask is positioned on the semi-fixed liquid crystal film; and a heat treatment step of heat-treating the semi-fixed liquid crystal film obtained after the ultraviolet curing step at a temperature higher than or equal to the temperature of phase transition to an isotropic phase, wherein a depolarizing layer including a first region corresponding to the opening part of the mask and a second region corresponding to the non-opening part is formed.

In regard to the method for producing a depolarizing film in the invention, it is preferable that the polymerizable liquid crystal composition includes a polymerizable liquid crystal compound represented by the following Formula (1):

$$Q\text{-}Sp^1\text{-}L^1\text{-}M^1\text{-}L^2\text{-}Sp^2\text{-}Ox \tag{1}$$

wherein in Formula (1), Q represents a polymerizable group; any one of $Sp^1$ and $Sp^2$ represents a branched alkylene, or an alkylene containing a divalent linking group selected from the group consisting of —O—, and —S— in at least one chain, while the other represents a linear alkylene; $L^1$ and $L^2$ each independently represent a divalent linking group; $M^1$ represents a mesogenic group having at least one divalent group selected from the group consisting of groups represented by the following Formulae (2-1) to (2-12); and Ox represents a group represented by the following Formula (3):

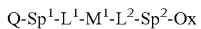
(2-1)

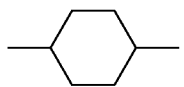
(2-2)

(2-3)

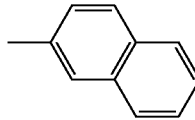
(2-4)

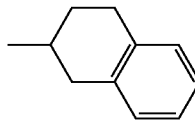
(2-5)

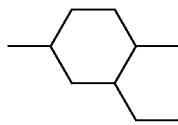
(2-6)

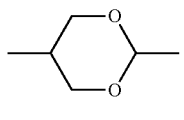
(2-7)

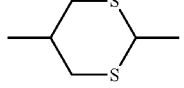
(2-8)

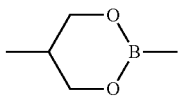
(2-9)

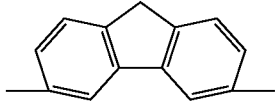
(2-10)

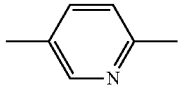
(2-11)

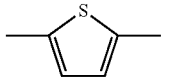
(2-12)

Formula (3)

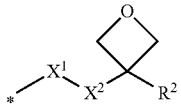

in Formula (3), $R^2$ represents a hydrogen atom, a methyl group, or an ethyl group; $X^1$ represents —O—, —S—, —OCO—, or —COO—; $X^2$ represents a single bond or an alkylene having 1 to 4 carbon atoms; and symbol * represents a site of bonding to $Sp^2$.

The depolarizing film in the invention is a depolarizing film including a depolarizing layer composed of a first region and a second region having differing optical characteristics, in which the area ratio between the first region and the second region in the depolarizing layer is 0.45:0.55 to 0.55:0.45, the first region is an optically anisotropic region that causes 90° optical rotation of light incident on one surface of the depolarizing layer before the light is emitted from the other surface, and the second region is an optically isotropic region having optical isotropy. Therefore, an emergent ray produced as light rays that have entered the depolarizing film and passed through the first region and the second region are mixed and depolarized, can be obtained. In the present optically anisotropic region, since 90°-rotation can be achieved irrespective of the direction of the polarizing axis, satisfactory depolarization is enabled without depending on the direction of the polarizing axis. Furthermore, in a case in which a λ/2 plate is used as in the case of conventional configurations, there is a possibility that wavelength dispersion may occur; however, in the present configuration, satisfactory depolarization can be realized regardless of the wavelength. Furthermore, since it is not a complicated structure in which regions having different directions of the fast axis are formed within one layer, the productivity is high, and definition enhancement is also possible.

DESCRIPTION OF THE PREFERRED EMBODIMENTS

In the following description, embodiments of the first depolarizing film in the invention will be described with reference to the drawings. In the respective drawings, the scale of the constituent elements is made appropriately different from the actual scale in order to make the constituent elements easily recognizable.

<Depolarizing Film>

Figure 1:
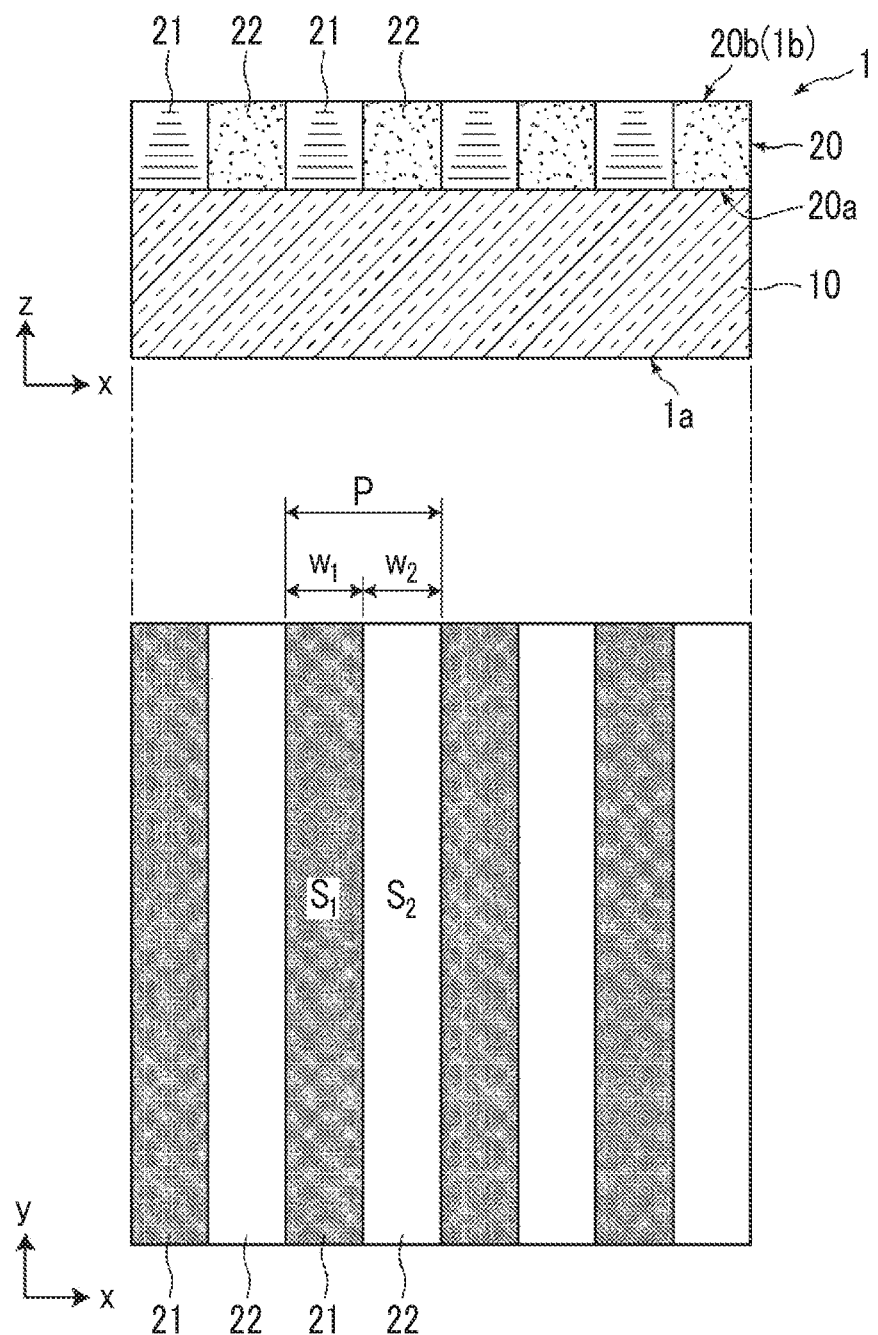
FIG. 1 is a cross-sectional view and a plan view schematically illustrating a depolarizing film of a first embodiment.

FIG. 1 is a schematic diagram illustrating a cross-sectional view and a plan view of the depolarizing film 1 according to a first embodiment in the invention.

The depolarizing film 1 according to the present embodiment includes a depolarizing layer 20 on a support 10. The depolarizing film in the invention may be composed only of a depolarizing layer.

The depolarizing layer 20 has a first region 21 and a second region 22 having differing optical characteristics. In the plan view of FIG. 1, the first region 21 is shown in gray (similarly applicable to FIG. 2 to FIG. 5 that will be described below) in order to distinguish the first region 21 from the second region 22. The area ratio $S_1:S_2$ between the area $S_1$ of the first region 21 and the area $S_2$ of the second region 22 is 0.45:0.55 to 0.55:0.45. Here, the area $S_1$ of the first region 21 and the area $S_2$ of the second region 22 are defined as total areas in a case in which the respective regions are present in large numbers. According to the present embodiment, the first region 21 and the second region 22 have an identical stripe shape and are alternately disposed in the width direction at a period P of, for example, 0.5 μm to 2.0 μm. In FIG. 1, the width $w_1$ in the direction of arrangement of the first region 21 and the width $w_2$ in the direction of arrangement of the second region 22 are the same and are each a half of the period of disposition P ($w_1=w_2=P/2$).

The phrase that the area $S_1:S_2$ is in the range of 0.45:0.55 to 0.55:0.45 implies that the area $S_1$ and the area $S_2$ are almost equal. In a case in which the area ratio $S_1:S_2$ is 0.45:0.55 to 0.55:0.45, the disposition is not limited to the pattern of alternate disposition as shown in FIG. 1, and the first region 21 and the second region 22 may be disposed in any pattern.

The area of the first region and the area of the second region can be determined by measuring the longitudinal and transverse lengths of a region by measurement using an electron microscope, and calculating the area.

The first region 21 is an optically anisotropic region having a function of causing 90° optical rotation of light incident on one surface 20a of the depolarizing layer 20 before the light is emitted from the other surface 20b. Light entering the first region 21 is outputted in a state in which the electric field vector is rotated 90°. Therefore, in a case in which an incident ray is linearly polarized light, the emergent ray has a polarizing axis that forms an inclination of 90° with respect to the polarizing axis at the time of incidence, irrespective of the direction of the polarizing axis of the incident ray. On the other hand, in a case in which an incident ray is circularly polarized light or non-polarized light, even if the electric field vector is rotated 90°, the apparent polarization state does not change, and the emergent ray has a polarization state equivalent to that of the incident ray.

The phrase "having a function of causing 90° optical rotation of light" as used in the invention provides an effect of rotating the electric field vector of an incident ray by 90° irrespective of the polarization state of the incident ray. Providing an effect of rotating the polarizing axis 90° only for polarized light having its polarizing axis inclined at a particular angle such as 45° (or −45°) with respect to the optical axis, as in the case of a λ/2 plate, does not correspond to the effect of "having a function of causing 90° optical rotation of light" in the invention.

Regarding the first region 21, the constituent material is not limited as long as the region has a function of causing 90° optical rotation of an incident ray and emitting the incident ray; however, the first region 21 can be formed using, for example, a liquid crystal material (polymerizable liquid crystal composition). Specifically, in a liquid crystal layer, the first region 21 can be constructed from a region formed by immobilizing a liquid crystalline phase oriented with a 90° twist (90° twisted liquid crystalline phase) between one surface and the other surface of a liquid crystal layer. Generally, in order to cause a 90° twist, Gooch-Tarry conditions are known, and a liquid crystal material satisfying these conditions can be used. Specifically, the conditions are described in detail in a book published by John Wiley & Sons, Inc.: Fundamentals of Liquid Crystal Devices, written by: Shin-TsonWu, Deng-Ke Yang (see the following Reference Document 1), page 201. Furthermore, Mauguin conditions in which the pitch of twist is sufficiently large with respect to the length are also known, and a liquid crystal material satisfying these conditions can be used. Specifically, the conditions are described in detail on page 64 of Reference Document 1 described above.

The second region 22 is an optically isotropic region having optical isotropy. Therefore, the second region 22 does not affect the polarization state of transmitted light and emits an incident ray without changing the characteristics thereof. Regarding the second region 22, the constituent material is not particularly limited as long as it is optically isotropic, and the second region may be even an air layer. In a case in which the first region 21 is formed from the 90° twisted liquid crystalline phase described above, it is preferable that the second region 22 is configured to have an isotropic phase formed by the same liquid crystal material as the constituent material of the first region 21.

Whether the first region in the depolarizing layer has a function of 90° optical rotation and the second region has isotropy can be checked by a known method such as, for example, making measurement using an AxoStep High-Precision Mueller Matrix Imaging Polarimeter manufactured by Axometrics, Inc., or the like.

As described previously, the first region 21 and the second region 22 in the depolarizing layer of the depolarizing film in the invention are such that as long as the areas of the two are approximately equal, there are no limitations on the pattern of disposition. FIG. 2 to FIG. 5 are schematic plan views illustrating examples of the pattern of disposition of first regions 21 and second regions 22 in the depolarizing layer.

Figure 2:
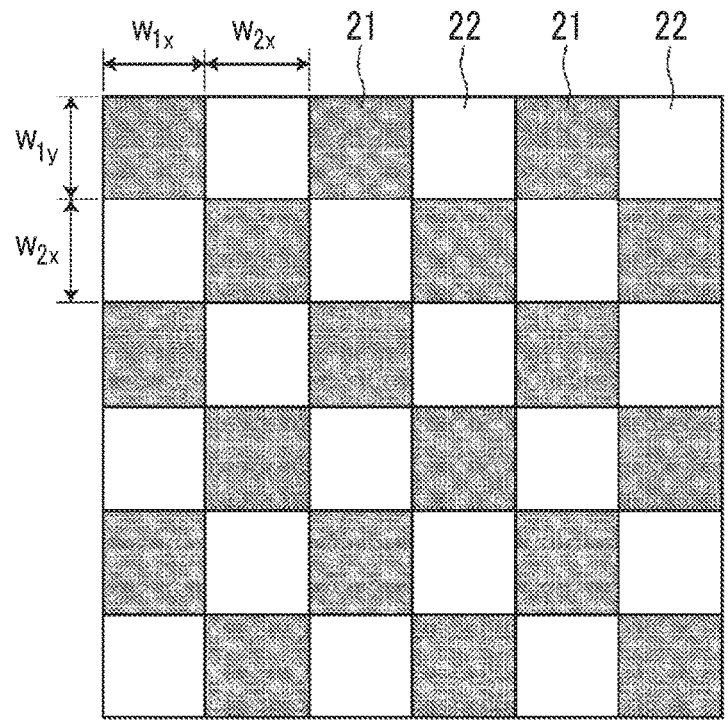
FIG. 2 is a plan view illustrating another example of the disposition pattern of first and second regions of a depolarizing layer (No. 1).

As illustrated in FIG. 2, the first region 21 and the second region 22 have an identical rectangular shape, and a pattern of disposition in which the rectangular shapes are alternately disposed longitudinally and transversely (directions of the arrows x and y in the figure) can be adopted. The respective rectangular-shaped regions 21 and 22 may have an oblong rectangular shape ($w_{1x}$, $w_{1y}$, $w_{2x}$, $w_{2y}$), or may have a square shape $w_{1x}=w_{1y}$, $w_{2x}=w_{2y}$).

Figure 3:
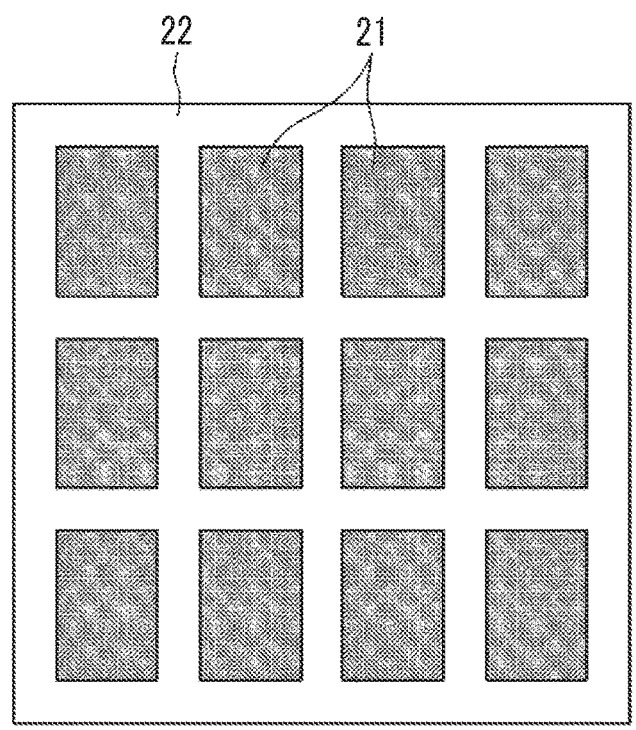
FIG. 3 is a plan view illustrating another example of the disposition pattern of the first and second regions of the depolarizing layer (No. 2).

As illustrated in FIG. 3, a pattern of disposition in which first regions 21 are two-dimensionally periodically disposed within a second region 22 may also be adopted. At this time, the second region 22 is formed from one continuous region. The area $S_2$ of the second region 22 and the total area $S_1$ of a plurality of the first regions 21 are almost equal.

Figure 4:
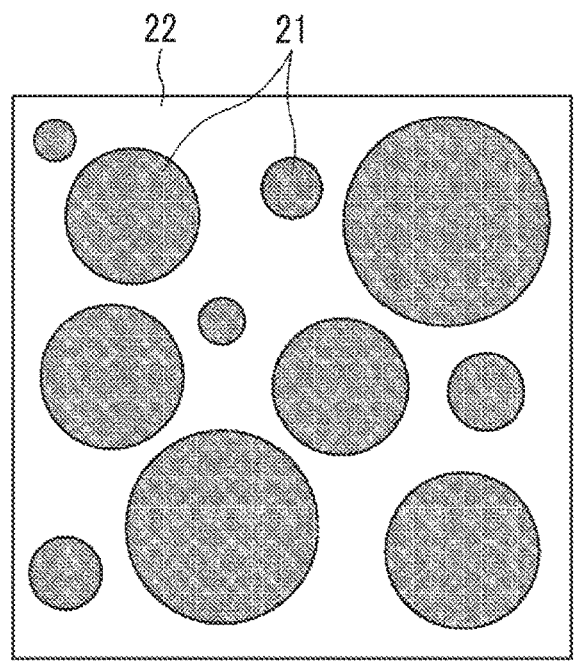
FIG. 4 is a plan view illustrating another example of the disposition pattern of the first and second regions of the depolarizing layer (No. 3).

Furthermore, the disposition of the first region 21 and the second region 22 is not limited to patterns in which the regions have an identical shape and are periodically disposed as shown in FIG. 1 to FIG. 3, and as shown in FIG. 4, first regions 21 having different sizes may be randomly provided within a second region 22.

Figure 5:
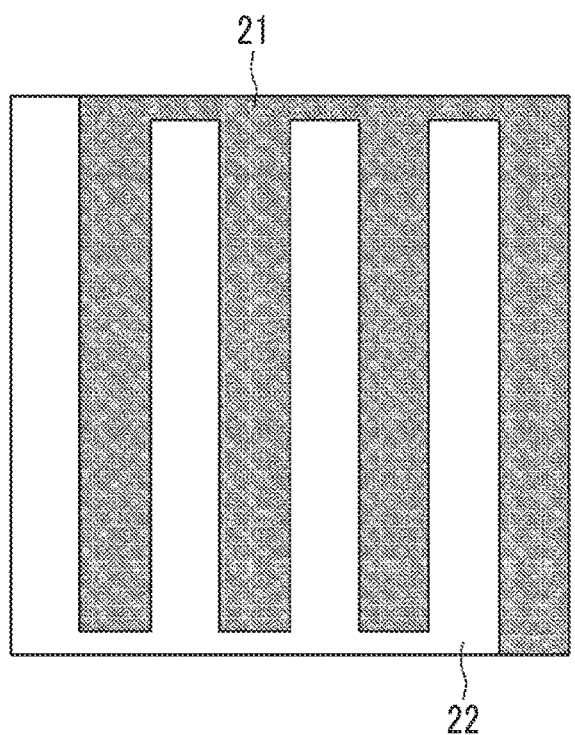
FIG. 5 is a plan view illustrating another example of the disposition pattern of the first and second regions of the depolarizing layer (No. 4).

As long as the areas $S_1$ and $S_2$ of the first region 21 and the second region 22 in the incident region of light are almost equal, there are no limitations on the shape and disposition of the respective regions. The patterns of disposition shown in FIG. 1 to FIG. 4 are such that both or one of the first region 21 and the second region 22 is formed from a plurality of regions; however, it is also acceptable that both the regions are formed from only one region as shown in FIG. 5.

In the present depolarizing film 1, light entering the first region 21 of the depolarizing layer 20 undergoes 90° optical rotation and is emitted, and light entering the second region 22 is emitted while maintaining the polarization characteristics at the time of incidence. As described previously, in a case in which the areas of the first region 21 and the second region 22 in the depolarizing film 1 have equal areas, approximately half the quantity of the light incident on the depolarizing film 1 passes through the first region 21, undergoes 90° optical rotation, and is emitted, while the remaining approximately half the quantity passes through the second region 22 and is emitted while maintaining the polarization characteristics at the time of incidence. As the two regions are equal, and rays that have added the two regions are mixed (synthesized), the emergent ray becomes depolarized light. That is, linearly polarized light incident on one surface 1a of the depolarizing film 1 is emitted from the other surface 1b as depolarized light. Meanwhile, the depolarizing film 1 is such that even in a case in which linearly polarized light is made incident on the other surface 1b and is emitted from the one surface 1a, the effect of depolarization can be similarly obtained. It is because the principle is similar while simply the direction of optical rotation of light in the first region 21 is reversed.

Figure 6:
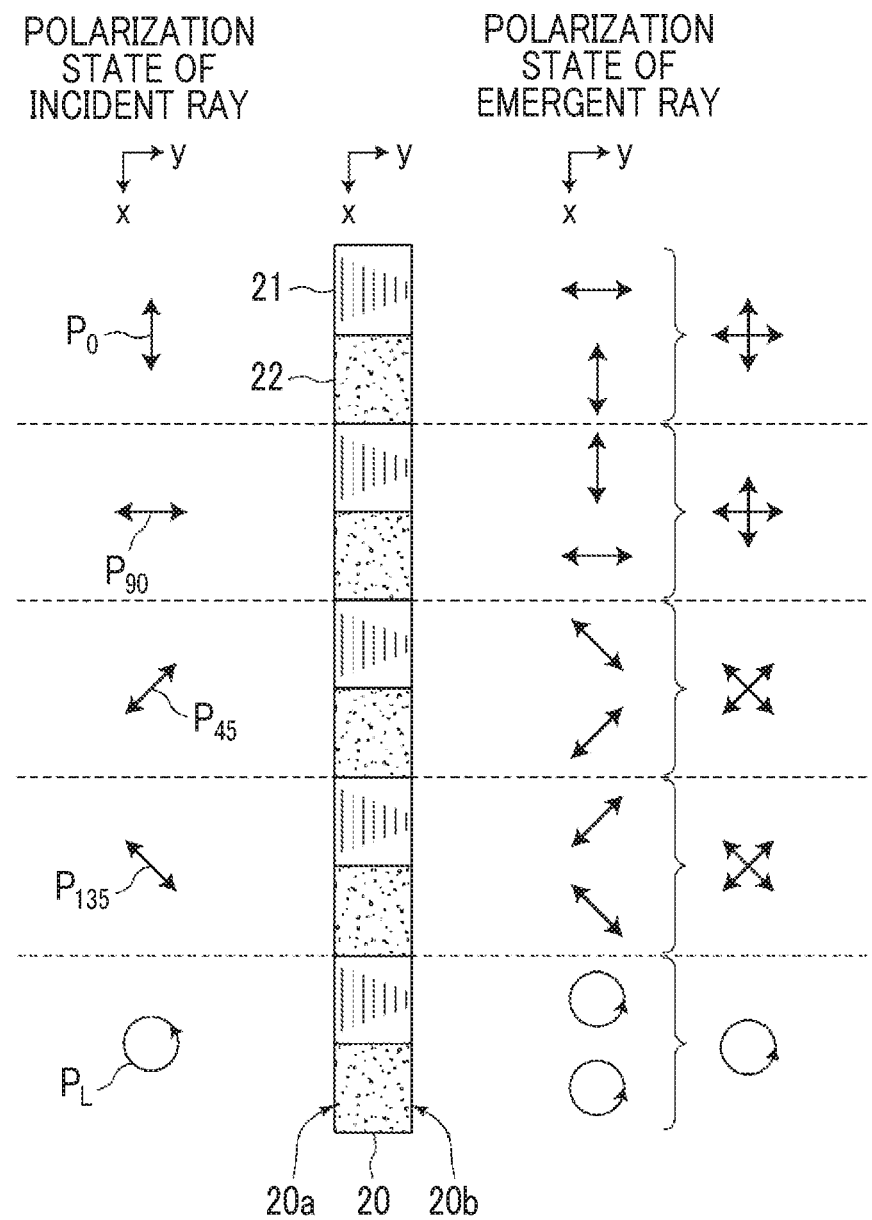
FIG. 6 is a schematic diagram for explaining the principle for depolarization by the depolarizing film of the first embodiment.

The principle of depolarization by the present depolarizing film 1 will be explained in more detail with reference to FIG. 6. FIG. 6 is a schematic diagram for explaining the principle for depolarization of linearly polarized light. In FIG. 6, in regard to a case in which the incident ray is linearly polarized light, and the inclination of the polarizing axis with respect to the +x-axis in the plane of the depolarizing film 1 (xy plane) is 0° ($P_0$), 90° ($P_{90}$), 45° ($P_{45}$), and 135° ($P_{135}$), and in regard to a case in which the incident ray is circularly polarized light and is left-handed circularly polarized light ($P_L$), the polarization states before incidence on the depolarizing layer 20 and after emission from the depolarizing layer 20 are shown. FIG. 6 shows the polarization state of an incident ray at the time when light passes through the depolarizing film 1 in the z-direction (FIG. 1), and the polarization states before and after the passage. The depolarizing layer 20 shows the xz cross-section, and the polarization state shows polarized light in the xy plane. The same also applies to FIG. 8 and FIG. 10 that will be described below.

In a case in which the incident ray is linearly polarized light and has a polarizing axis $P_0$ along the x-axis (the inclination with respect to the +x-axis is 0°), the portion of light that passes through the first region 21 in the incident ray has its polarizing axis rotated by 90° and is emitted as linearly polarized light having a polarizing axis $P_{90}$ inclined by 90° with respect to the +x-axis. On the other hand, the portion of light that passes through the second region 22 is emitted at an inclination of 0° without having its polarizing axis changed. Therefore, the light emitted from the first region 21 and the light emitted from the second region have polarizing axes $P_{90}$ and $P_0$ that orthogonally intersect each other. As the areas of the first and second regions in the depolarizing layer 20 are approximately equal, the rays that have passed through the first and the second regions are mixed (synthesized), and thereby an emergent ray having the linear polarization eliminated can be obtained.

In a case in which the incident ray is linearly polarized light and has a polarizing axis $P_{90}$ inclined by 90° with respect to the +x-axis, the portion of light that has passed through the first region 21 in the incident ray has its polarizing axis rotated by 90° and is emitted as linearly polarized light having a polarizing axis $P_{180}$ (=$P_0$) inclined by 180° (along the x-axis) with respect to the +x-axis. Meanwhile, the portion of light that has passed through the second region 22 is emitted at an inclination of 90°, without having its polarizing axis changed. Therefore, the light emitted from the first region 21 and the light emitted from the second region 22 have polarizing axes $P_{180}$ and $P_{90}$ that orthogonally intersect each other. At this time, as described above, the rays that have passed through the first and second regions are synthesized, and consequently, an emergent ray having the linear polarization eliminated can be obtained.

In a case in which the incident ray is linearly polarized light and has a polarizing axis $P_{45}$ inclined at 45° with respect to the +x-axis, the portion of light that has passed through the first region 21 in the incident ray has its polarizing axis rotated by 90° and is emitted as linearly polarized light having a polarizing axis $P_{135}$ inclined at 135° with respect to the +x-axis. Meanwhile, the portion of light that has passed through the second region 22 is emitted at an inclination of 45° without having its polarizing axis changed. Therefore, the light emitted from the first region 21 and the light emitted from the second region have polarizing axes $P_{135}$ and $P_{45}$ that orthogonally intersect each other. At this time, as described above, the rays that have passed through the first and second regions are synthesized, and consequently, an emergent ray having the linear polarization eliminated can be obtained.

Similarly, in a case in which the incident ray is linearly polarized light and has a polarizing axis $P_{135}$ inclined at 135° with respect to the +x-axis, the portion of light that has passed through the first region 21 in the incident ray has its polarizing axis rotated at 90° and is emitted as linearly polarized light having a polarizing axis $P_{225}$ ($=P_{45}$) inclined at 225° with respect to the +x-axis.

Meanwhile, the portion of light that has passed through the second region 22 is emitted at an inclination of 135° without having its polarizing axis changed. Therefore, the light emitted from the first region 21 and the light emitted from the second region 22 have polarizing axes $P_{225}$ and $P_{135}$ that orthogonally intersect each other. At this time, as described above, the rays that have passed through the first and second regions are synthesized, and consequently, an emergent ray having the linear polarization eliminated can be obtained.

In case in which the incident ray is linearly polarized light, there are no limitations on the inclination α with respect to the x-axis of the polarizing axis. The inclination of the polarizing axis after the incident ray has passed through the first region 21 is α+π/2, and the inclination α of the polarizing axis of the light that has passed through the second region 22 is maintained without change. Therefore, since the polarizing axes of the light that has passed through the first region 21 and the light that has passed through the second region 22 necessary orthogonally intersect each other, an emergent ray having the polarization eliminated can be obtained regardless of the inclination α of the polarizing axis of the incident ray.

With the depolarizing film of the present configuration, a similar effect of depolarization can be obtained at any wavelength of incidence, regardless of the wavelength of the incident ray.

On the other hand, in a case in which the incident ray is circularly polarized light and is left-handed circularly polarized light $P_L$, since the rays that have passed through the first region 21 and the second region 22 are emitted while still being left-handed circularly polarized light $P_L$, the emergent ray maintains the polarization state of the left-handed circularly polarized light $P_L$. Although not shown in the diagram, in a case in which the incident ray is right-handed circularly polarized light, similarly the emergent ray remains as right-handed circularly polarized light.

Figure 7:
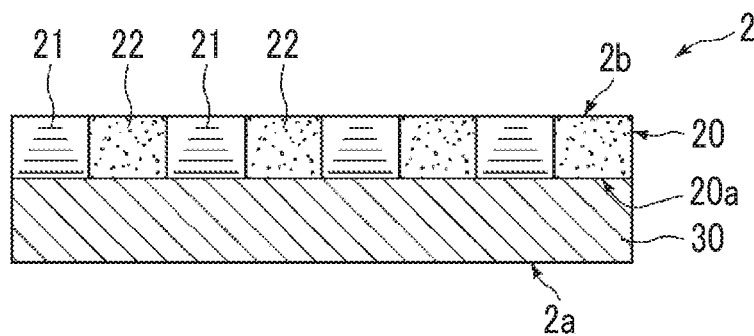
FIG. 7 is a cross-sectional view schematically illustrating a depolarizing film of a second embodiment.

FIG. 7 is a schematic cross-sectional view of a depolarizing film 2 of a second embodiment.

The depolarizing film 2 of the second embodiment is formed by a depolarizing layer 20 and a λ/4 plate 30 laminated together.

The configuration of the depolarizing layer 20 is the same as that of the depolarizing layer 20 in the depolarizing film of the first embodiment. It is preferable from the viewpoint of suppressing wavelength dispersion that the λ/4 plate 30 is a broadband λ/4 plate that can give a constant phase difference (λ/4) at any wavelength.

Figure 8:
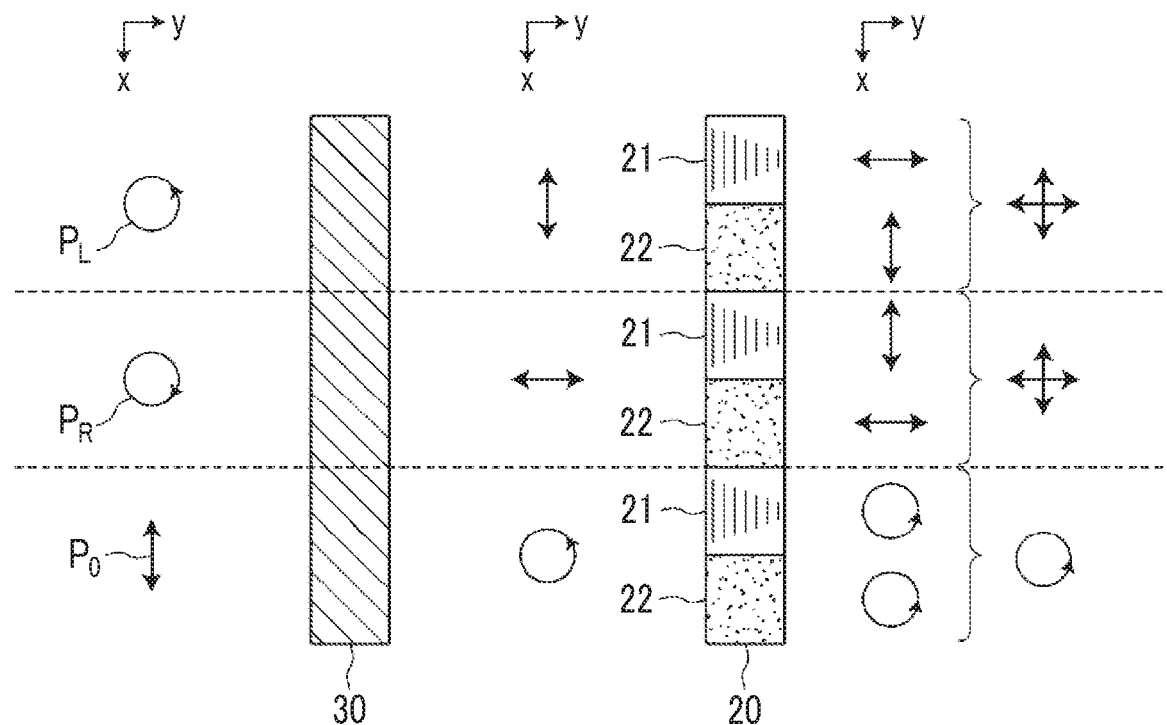
FIG. 8 is a schematic diagram for explaining the principle for depolarization by the depolarizing film of the second embodiment.

The depolarizing film 2 is to provide a depolarizing effect for circularly polarized light incident on a surface 2a on the λ/4 plate 30 side of the depolarizing film. The light incident on the side of the λ/4 plate 30 of the depolarizing film 2 passes through the λ/4 plate 30 and the depolarizing layer 20 in order and is emitted from the other surface 2b. The principle of depolarization will be explained with reference to FIG. 8. FIG. 8 is a schematic diagram for explaining the principle for depolarization of circularly polarized light by a depolarizing film. In FIG. 8, in regard to a case in which the incident ray is circularly polarized light and is left-handed circularly polarized light ($P_L$) or right-handed circularly polarized light ($P_R$), and a case in which the incident ray is linearly polarized light and the inclination of the polarizing axis with respect to the +x-axis in a plane (xy plane) of the depolarizing film 2 is 0° (polarizing axis $P_0$), the polarization states before incidence on the λ/4 plate 30 (before incidence on film 2) and after passage through the λ/4 plate 30, and the polarization state after passage through the depolarizing layer 20 (after emission from film 2) are respectively shown.

In a case in which the incident ray is circularly polarized light and is left-handed circularly polarized light $P_L$, light that has passed through the λ/4 plate 30 is converted to linearly polarized light. The polarizing axis of this linearly polarized light is designated as the +x-axis. The portion of light that passes through the first region 21 of the depolarizing layer 20 in the light that has become linearly polarized by passing through the λ/4 plate, has its polarizing axis rotated by 90°, and the portion of light that passes through the second region 22 is emitted directly without having the polarizing axis rotated. Therefore, the polarizing axes of the light emitted from the first region 21 of the depolarizing layer 20 and the light emitted from the second region 22 orthogonally intersect each other. As a result of the above-described action, circularly polarized light incident on the surface 2a on the λ/4 plate 30 side of the depolarizing film 2 is emitted from the surface 2b on the depolarizing layer 20 side, as depolarized light.

Similarly, in a case in which the incident ray is circularly polarized and is right-handed circularly polarized light $P_R$, the light that has passed through the λ/4 plate 30 is converted to linearly polarized light. At this time, in a λ/4 plate 30 having an effect of converting left-handed circularly polarized light $P_L$ into linearly polarized light having a polarizing axis in the x-axis direction, right-handed circularly polarized light $P_R$ is converted to linearly polarized light having a polarizing axis in the y-axis direction that is inclined by 90° with respect to the x-axis. The portion of light that passes through the first region 21 of the depolarizing layer 20 in the light that has become linearly polarized light by passing through the λ/4 plate, has its polarizing axis rotated by 90°, and the portion of light that passes through the second region 22 is emitted directly. Thereby, the polarizing axes of the light emitted from the first region 21 and the light emitted from the second region 22 orthogonally intersect each other. Circularly polarized light incident on the surface 2a on the λ/4 plate 30 side of the depolarizing film 2 is emitted from the surface 2b on the depolarizing layer 20 side, as depolarized light.

On the other hand, in a case in which an incident ray is linearly polarized light having a polarizing axis $P_0$ in the x-axis direction, light that has passed through the λ/4 plate 30 is converted to circularly polarized light in a predetermined direction (in this case, left-handed). As described above, even if the circularly polarized light passes through the depolarizing layer 20, the polarization state is maintained without change. Therefore, in a case in which linearly polarized light is made incident on the present depolarizing film 2, linear polarization itself is eliminated; however, circular polarization in a predetermined direction remains in the emergent ray.

The depolarizing film 2 of the second embodiment may include a support between the λ/4 plate 30 and the depolarizing layer 20, or on a surface of the depolarizing layer 20, the surface being on the opposite side of the λ/4 plate 30.

As described above, the depolarizing film 1 of the first embodiment provides an effect of depolarization for linearly polarized light, and the depolarizing film 2 of the second embodiment provides an effect of depolarization for circularly polarized light. Thus, by combining the two, a depolarizing member by which an effect of depolarization for both linearly polarized light and circularly polarized light can be obtained, can be constructed.

Figure 9:
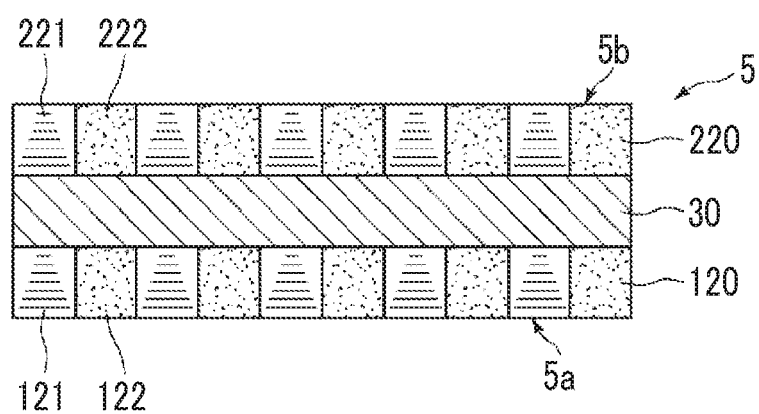
FIG. 9 is a cross-sectional view schematically illustrating a depolarizing member of embodiments.

FIG. 9 is a schematic cross-sectional view of an embodiment of the depolarizing member in the invention. The depolarizing member 5 of the present embodiment is configured such that two layers of depolarizing layers 120 and 220 are disposed to face each other with a λ/4 plate 30 interposed therebetween.

The first and second depolarizing layers 120 and 220 both have a configuration similar to that of the depolarizing layer 20 according to the first embodiment. In FIG. 9, the first depolarizing layer 120 and the second depolarizing layer 220 are disposed such that the respective first regions 121 and 221 and the respective second regions 122 and 222 fall in line with each other; however, the respective regions may be out of alignment. Furthermore, the pattern of disposition of the first region 121 and the second region 122 in the first depolarizing layer 120 may differ from the pattern of disposition of the first region 221 and the second region 222 in the second depolarizing layer 220. For example, the first depolarizing layer 120 may have a checker-shaped pattern as shown in FIG. 2, and the second depolarizing layer 220 may have a pattern in which first regions of various sizes are randomly disposed as shown in FIG. 4. It is also preferable that the λ/4 plate 30 is a broadband λ/4 plate, similarly to the case of the depolarizing film 2 of the second embodiment.

The depolarizing member 5 of the present embodiment can give a depolarization effect irrespective of whether the incident ray is linearly polarized light or circularly polarized light. Light incident on one surface 5a of the depolarizing member 5 passes through a first depolarizing layer 120, a λ/4 plate 30, and a second depolarizing layer 220 and is emitted from the other surface 5b. Meanwhile, similar effects can be obtained irrespective of whether the incident ray is made incident on any of the surfaces 5a and 5b.

Figure 10:
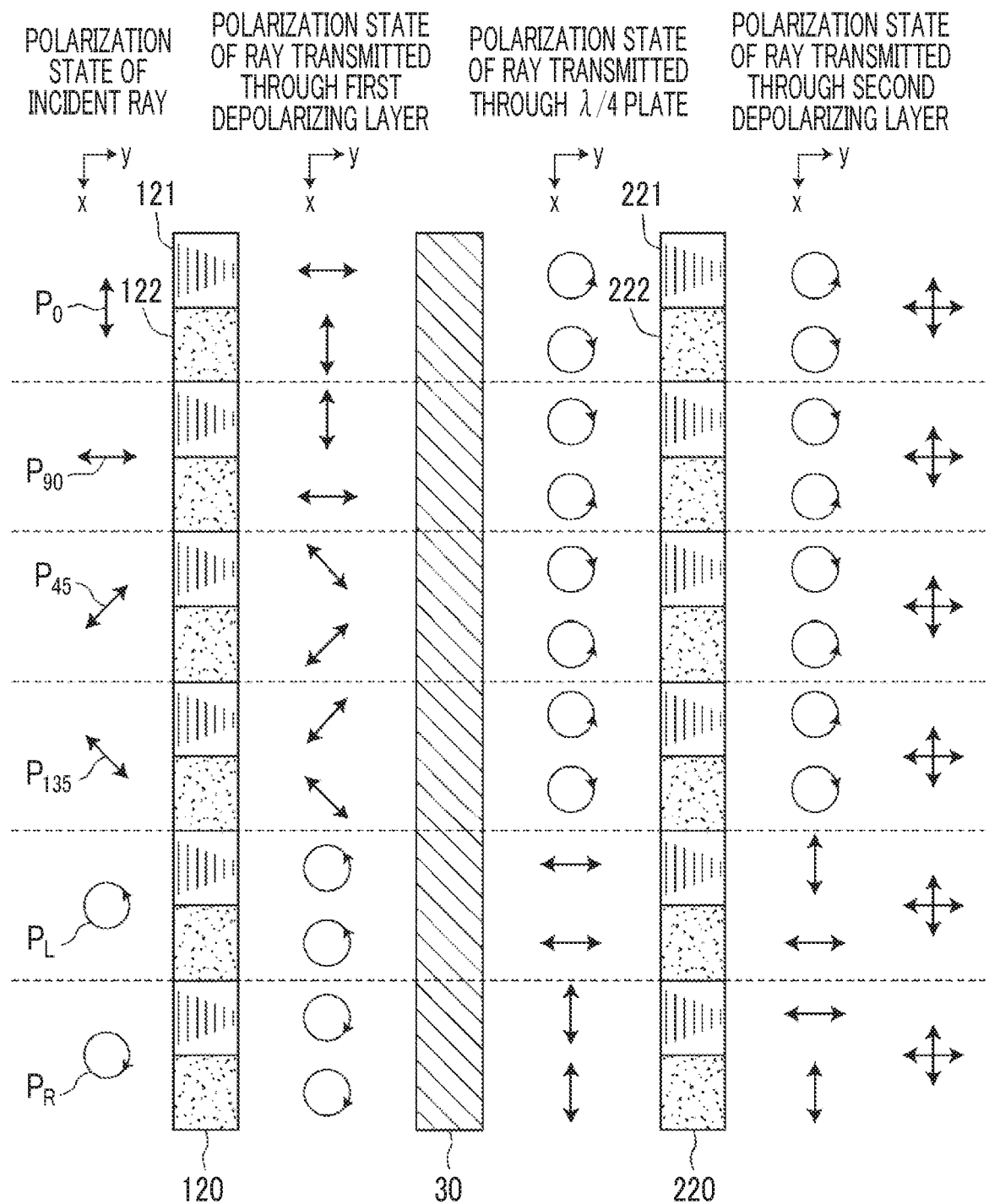
FIG. 10 is a schematic diagram for explaining the principle for depolarization by the depolarizing member.

The principle for depolarization by the depolarizing member 5 will be explained with reference to FIG. 10. FIG. 10 is a schematic diagram for explaining the principle for depolarizing of linearly polarized light and circularly polarized light by the depolarizing member 5. In FIG. 10, in regard to a case in which the incident ray is linearly polarized light, and the inclination of the polarizing axis with respect to the +x-axis in a plane (xy plane) of the depolarizing member 5 is 0° (polarizing axis $P_0$), 90° (polarizing axis $P_{90}$), 45° (polarizing axis $P_{45}$), and 135° (polarizing axis $P_{135}$), and a case in which the incident ray is circularly polarized light is left-handed circularly polarized light $P_L$ or right-handed circularly polarized light $P_R$, the polarization states of before incidence on the first polarizing layer 120 (before incidence on the depolarizing member 5), after being transmitted through the first polarizing layer 120, after being transmitted through the λ/4 plate 30, and after being transmitted through the second depolarizing layer 220 (after emission into the depolarizing member 5) are respectively shown.

In a case in which the incident ray is linearly polarized light and has a polarizing axis $P_0$ along the x-axis (the inclination with respect to the +x-axis is (0°), the light that passes through the first region 121 of the first depolarizing layer 120 has its polarizing axis rotated by 90° and is emitted as linearly polarized light having a polarizing axis $P_{90}$ inclined by 90° with respect to the +x-axis. Meanwhile, the light that passes through the second region 122 of the first depolarizing layer 120 is emitted at an inclination of 0° without any change in the polarizing axis. The light that has passed through the first region 121 of the first depolarizing layer 120 and the light that has passed through the second region 122 are subsequently converted to circularly polarized lights in mutually opposite directions by passing through the λ/4 plate 30. Since circularly polarized light does not have any change in the polarizing state in the second depolarizing layer 220, the lights are emitted from the first region 221 and the second region 222 while remaining as circularly polarized lights in mutually opposite directions. The areas of the first region and the second region are approximately equal. Circularly polarized lights in mutually opposite directions cancel each other by being mixed (synthesized), circular polarization is eliminated, and thus an emergent ray that is finally depolarized can be obtained.

In a case in which the incident ray is linearly polarized light, light that has been depolarized by passing through the first depolarizing layer 120, the λ/4 plate 30, and the second depolarizing layer 220 can be obtained under a similar principle, irrespective of the inclination of the polarizing axis of the incident ray with respect to the x-axis.

In a case in which the incident ray is circularly polarized light and is left-handed circularly polarized light $P_L$, rays of light that have passed through the first region 121 and the second region 122 in the first depolarizing layer 120 are both emitted as left-handed circularly polarized light $P_L$. Subsequently, the light rays pass through the λ/4 plate 30 and are converted to linearly polarized light. Furthermore, the portion of light that passes through the first region 221 in the second depolarizing layer 220 has its polarizing axis rotated by 90°, and the portion of light that passes through the second region 222 is emitted directly. The polarizing axes of the light emitted from the first region 221 and the light emitted from the second region 222 orthogonally intersect each other, and consequently, a depolarized emergent ray can be obtained.

Also in a case in which the incident ray is right-handed circularly polarized light PR, similarly, light that has been depolarized by passing through the first depolarizing layer 120, the λ/4 plate 30, and the second depolarizing layer 220 can be obtained under a similar principle.

The depolarizing member 5 is configured such that the first depolarizing layer 120, the λ/4 plate 30, and the second depolarizing layer 220 are laminated as shown in FIG. 9; however, the depolarizing member may include a support between the respective layers or on the surface of light incidence or emergence, and may also have gaps between the respective layers.

Next, with regard to a case in which the first region 21 and the second region 22 of the depolarizing layer 20 are formed from the same liquid crystal material, the material and the production method will be explained.

(Liquid Crystal Material)

Regarding the liquid crystal material for forming the depolarizing layer 20, a composition including a polymerizable liquid crystal compound having a cationic polymerizable group and a radical polymerizable group, a chiral agent, and a cationic polymerization initiator is preferred. The wavelength characteristics of the polymerizable liquid crystal compound may be positively dispersible or negatively dispersible. The composition may further include other components such as an orientation controlling agent and an alignment aid. Particularly, a polymerizable liquid crystal composition including the polymerizable liquid crystal compound described in JP2008-127336A can be suitably utilized.

—Polymerizable Liquid Crystal Compound—

Regarding the polymerizable liquid crystal compound having a cationic polymerizable group and a radical polymerizable group, a polymerizable liquid crystal compound represented by the following Formula (1) is suitable.

Q-Sp$^1$-L$^1$-M$^1$-L$^2$-Sp$^2$-Ox    (1)

In Formula (1), Q represents a polymerizable group. According to the present specification, regarding the polymerizable group Q, in a case in which —CO—, —OCO—, —COO—, and the like are bonded to a polymerizable double bond or the like, these —CO—, —OCO—, —COO—, and the like are also included in the polymerizable group. Here, the polymerizable group Q is a radical polymerizable group. Since Ox that will be described in detail later is a cationic polymerizable group, polymerization reactions can be carried out under different conditions by adopting a radical polymerizable group. The radical polymerizable group is preferably a (meth)acryloyloxy group or a (meth)acryloyl, and more preferably a (meth)acryloyloxy group.

In Formula (1), any one of Sp$^1$ and Sp$^2$ represents a branched alkylene, or an alkylene containing a divalent linking group selected from the group consisting of —O—, —C≡C—, and —S— in at least one chain, while the other represents a linear alkylene. As such, as different structures, that is, asymmetric structures, are adopted for Sp$^1$ and Sp$^2$, the solubility in an organic solvent, particularly MEK or the like, is enhanced. Between a branched alkylene group and an alkylene containing a divalent linking group selected from the group consisting of —O—, —C≡C—, and —S— in at least one chain, preferred is an alkylene group containing —O— or —C≡C— in the chain; and more preferred is —(CH$_2$)$_{n1}$—X—(CH$_2$)$_{n2}$—. Here, n1 and n2 each independently represent an integer from 1 to 4, and preferably 1 or 2. —X— represents —O— or and preferably —O—. In a case in which —X— is —O—, it is preferable that n1 and n2 are both 2, and in a case in which —X— is it is preferable that n1 and n2 are both 1. The number of carbon atoms of the branched alkylene (including the number of carbon atoms of the branch chain) is preferably 4 to 12, more preferably 4 to 8, and even more preferably 4 to 6. The branch chain is preferably a methyl group or an ethyl group, and more preferably a methyl group.

The number of carbon atoms of the other linear alkylene is preferably 2 to 12, more preferably 4 to 8, and even more preferably 4 to 6. There are no particular limitations on the selection of which of a branched alkylene or an alkylene containing a divalent linking group selected from the group consisting of —O—, —C≡C—, and —S— in at least one chain, and a linear alkylene will be adopted for Sp$^1$ or Sp$^2$, and selection can be made as appropriate according to the use application or the method. In the invention, in order to first polymerize —Ox between the polymerizable group Q and —Ox, it is preferable that Sp$^2$ is a linear alkylene, and Sp$^1$ is a branched alkylene or an alkylene containing a divalent linking group selected from the group consisting of —O—, —C≡C—, and —S— in at least one chain. As such, in a case in which polymerization is carried out stepwise, since the second polymerization has lowered fluidity compared to the first polymerization, the polymerization ratio tends to be lowered. From this, in a case in which a spacer on the polymerizable group that is polymerized in the first round is a branched alkylene or an alkylene containing a divalent linking group selected from the group consisting of —O—, —C≡C—, or —S— in at least one chain, mesogenic sites are likely to thermally fluctuate, and as a result, heat resistance is deteriorated. Thus, by adopting a linear alkylene as a spacer on the side of the polymerizable group that is polymerized in the first round, thermal fluctuation of mesogenic sites is suppressed, and consequently heat resistance is improved.

In Formula (1), L$^1$ and L$^2$ each independently represent a divalent linking group. As long as L$^1$ and L$^2$ each represent a group that links Sp$^1$ with M$^1$ and Sp$^2$ with M$^1$, there are no particular limitations; however, L$^1$ and L$^2$ are each preferably a single bond, —O—, —S—, —OCO—, —COO—, —CO—, —CH$_2$—, —CONH—, or —NHCO—. L$^1$ and L$^2$ are each more preferably a single bond, —O—, —S—, —OCO—, or —COO—; even more preferably a single bond, —O—, or —CH$_2$—; and most preferably —O—. It is preferable that L$^1$ and L$^2$ are the same divalent linking groups, and it is more preferable that L$^1$ and L$^2$ together represent —O—. According to the present specification, in a case in which —O— is directly bonded to M$^1$, —O— is handled as L$^1$ or L$^2$ and is not intended to constitute Sp$^1$ or Sp$^2$.

In Formula (1), M$^1$ represents a mesogenic group having at least one divalent group selected from the following Formulae (2-1) to (2-12), preferably having three or more such divalent groups, and more preferably three such divalent groups.

(2-1)

(2-2)

(2-3)

(2-4)

(2-5)

(2-6)

(2-7)

(2-8)

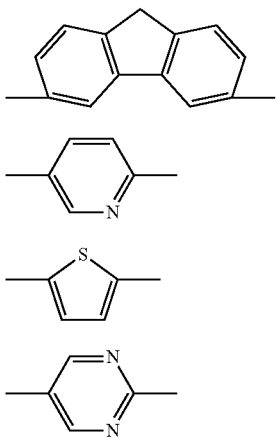

(2-9)

(2-10)

(2-11)

(2-12)

For example, the divalent group represented by Formula (2-1) represents an unsubstituted 1,4-cyclohexylene group, and the divalent group represented by Formula (2-2) represents an unsubstituted 1,4-phenylene group.

In a case in which the mesogenic group represented by $M^1$ is composed of two or more of the above-mentioned groups, the above-mentioned groups may be respectively linked by a linking group selected from the group consisting of a single bond, an acetylene group (—C≡C—), —N=N—, —N=CH—, —C(CN)=CH—, —CONHCONHCO—, —O—, —S—, —OCO—, —COO—, —OCOO—, —CO—, —CH$_2$—, —OCH$_2$—, —CH$_2$O—, —CONH—, —NHCO—, —NHCOO—, and —OCONH—. Preferably, the above-mentioned groups may be respectively linked by a linking group selected from the group consisting of a single bond, an acetylene group (—C≡C—), —OCO—, —COO—, —OCH$_2$—, —CH$_2$O—, —N=N—, —N=CH—, —C(CN)=CH—, —CONH—, —NHCO—, and —CONHCONHCO—; and more preferably, the above-mentioned groups may be respective linked by a linking group selected from the group consisting of a single bond, an acetylene group (—C≡C—), —OCO—, —COO—, —CONH—, and —NHCO—.

In Formula (1) described above, Ox represents a group represented by the following Formula (3):

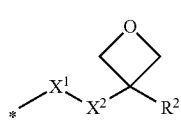

Formula (3)

In Formula (3) described above, $R^2$ represents a hydrogen atom, a methyl group, or an ethyl group; preferably a methyl group or an ethyl group; and more preferably a methyl group. $X^1$ represents —O—, —S—, —OCO—, or —COO—; preferably —O— or —OCO— (the Ox side is O, and the Sp side is CO); and more preferably —O—. $X^2$ represents a single bond or an alkylene having 1 to 4 carbon atoms; preferably an alkylene having 1 or 2 carbon atoms; and more preferably an alkylene having one carbon atom (methylene). Symbol * represents a site of bonding to $Sp^2$.

Specific examples of the polymerizable liquid crystal compound represented by Formula (1) are listed in JP2008-127336A, and those can be used as appropriate. The concentration of the polymerizable liquid crystal compound in the polymerizable liquid crystal composition is preferably 30% by mass to 99.9% by mass, more preferably 50% by mass to 99.9% by mass, and even more preferably 70% by mass to 99.9% by mass, with respect to the total mass of the composition.

—Chiral Agent (Optically Active Compound)—

A chiral agent has a function of inducing a twisted liquid crystalline phase. The chiral agent is not particularly limited, and any known compound (for example, described in Liquid Crystal Device Handbook, Chapter 3, Section 4-3, Chiral Agents for TN and STN, page 199, edited by Japan Society for the Promotion of Science, 142$^{nd}$ Committee, 1989), and isosorbide and isomannide derivatives can be used.

A chiral agent generally contains an asymmetric carbon atom; however, an axially asymmetric compound or a planar asymmetric compound can also be used as the chiral agent. Examples of the axially asymmetric compound or the planar asymmetric compound include binaphthyl, helicene, paracyclophane, and derivatives thereof. The chiral agent may have a polymerizable group. In a case in which both the chiral agent and the liquid crystal compound have a polymerizable group, a polymer having a repeating unit derived from a polymerizable liquid crystal compound and a repeating unit derived from a chiral agent can be formed by a polymerization reaction between the polymerizable chiral agent and the polymerizable liquid crystal compound. In this embodiment, it is preferable that the polymerizable group carried by the polymerizable chiral agent is a group of the same kind as the polymerizable group carried by the polymerizable liquid crystal compound. Therefore, it is preferable that the polymerizable group of the chiral agent is also an unsaturated polymerizable group, an epoxy group, or an aziridinyl group; more preferably an unsaturated polymerizable group; and particularly preferably an ethylenically unsaturated polymerizable group.

The chiral agent may also be a liquid crystal compound.

The chiral agent may also have a photoisomerizable group. The photoisomerizable group is preferably an isomerization site of a compound exhibiting photochromic properties, or an azo, azoxy, or cinnamoyl group. Regarding specific compounds, the compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A can be used.

The content of the chiral agent in the polymerizable liquid crystal composition is preferably 0.01 mol % to 200 mol %, and more preferably 1 mol % to 30 mol %, of the amount of the polymerizable liquid crystal compound.

—Cationic Initiator (Photocation Generating Agent)—

The photocation generating agent may be any compound as long as it has an action of generating an acid by light irradiation and initiating cationic polymerization of an oxetanyl group; however, an onium salt is preferred. In this case, the counter anion may be any of an organic anion and an inorganic anion. Examples of the onium salt include an iodonium salt, a diazonium salt, and a sulfonium salt; however, a sulfonium salt and an iodonium salt are preferred. In consideration of thermal stability, a sulfonium salt is more preferred. Regarding the photocation generating agent, those described in paragraph [0053] of JP2008-127336A can be utilized as appropriate.

The amount of addition of the photocation generating agent may vary depending on the structure of the mesogenic group or the spacer in the polymerizable liquid crystal compound, the oxetanyl group equivalent, the conditions for orientation of liquid crystals, and the like; however, conventionally, the amount of addition is usually 100 ppm by mass to 20% by mass, preferably 1,000 ppm by mass to 10% by mass, more preferably 0.2% by mass to 7% by mass, and most preferably in the range of 0.5% by mass to 5% by mass, with respect to the total mass of the monomers in the liquid crystalline composition.

—Other Components—

A composition used in order to form a twisted liquid crystalline phase may include, in addition to the liquid crystal compound, the chiral agent, and the cationic initiator described above, other components such as an orientation controlling agent and an alignment aid. For all of them, known materials can be utilized.

—Solvent—

Regarding the solvent of compositions for realizing a twisted liquid crystalline phase and an isotropic phase, an organic solvent is preferably used. Examples of the organic solvent include an amide (for example, N,N-dimethylformamide), a sulfoxide (for example, dimethyl sulfoxide), a heterocyclic compound (for example, pyridine), a hydrocarbon (for example, benzene and hexane), an alkyl halide (for example, chloroform and dichloromethane), an ester (for example, methyl acetate and butyl acetate), a ketone (for example, acetone, methyl ethyl ketone, and cyclohexanone), and an ether (for example, tetrahydrofuran and 1,2-dimethoxyethane). An alkyl halide and a ketone are preferred. Two or more kinds of organic solvents may be used in combination.

<Formation of Depolarizing Layer>

Figure 11:
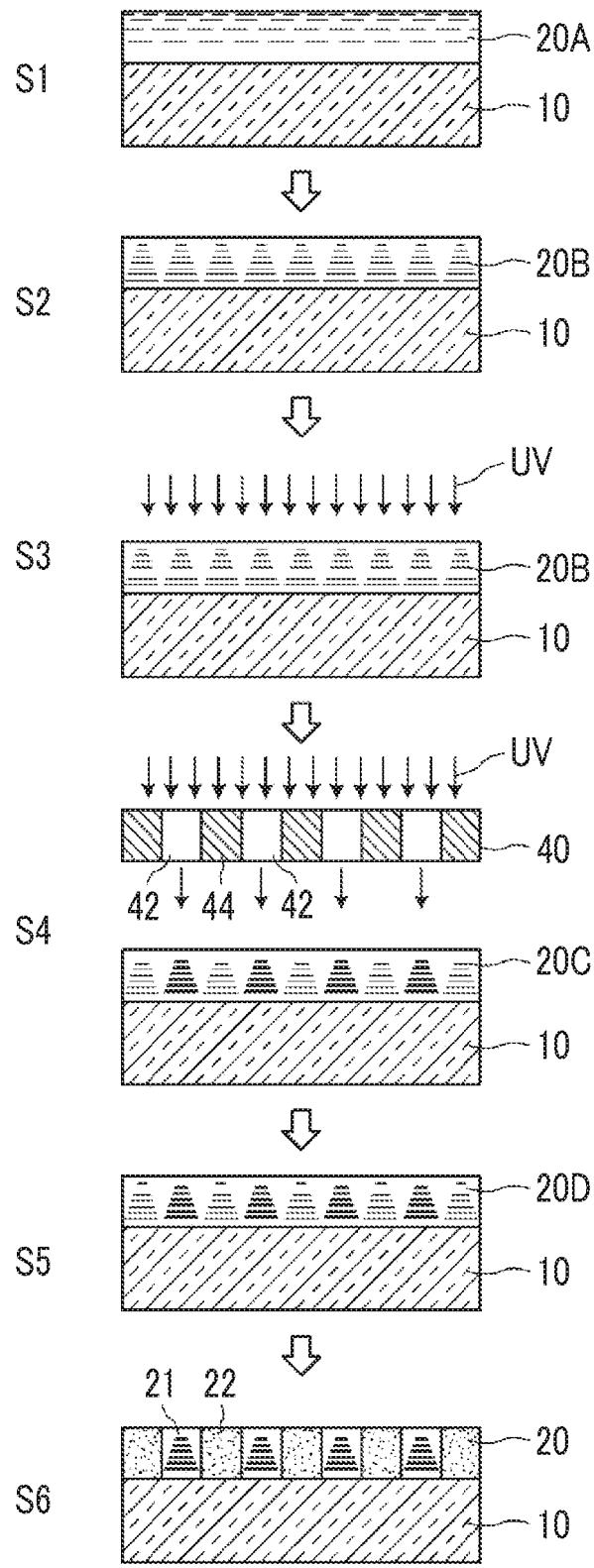
FIG. 11 is a flow chart showing a process for forming a depolarizing layer.

A method for forming a depolarizing layer will be explained with reference to the production process illustrated in FIG. 11.

<<Coating Step>>

A polymerizable liquid crystal composition is evenly applied on the surface of a support 10 (or an oriented film provided on a support), and a coating film 20A is formed (S1).

Application of the polymerizable liquid crystal composition can be carried out by converting the polymerizable liquid crystal composition into a solution state using a solvent or into a liquid material such as a molten liquid obtained by heating, and spreading the solution or the liquid material by an appropriate method such as a roll coating method, a gravure printing method, or a spin coating method, or the like. Furthermore, the application can be carried out by various methods such as a wire bar coating method, an extrusion coating method, a direct gravure coating method, a reverse gravure coating method, and a die coating method. A coating film can also be formed by discharging a liquid crystal composition through a nozzle using an inkjet apparatus.

<<Aging Step>>

The coating film 20A is maintained (aged) at a twisted liquid crystalline phase formation temperature for a certain time period, and the liquid crystal molecules are aligned into a twisted phase (S2). The aging temperature and the aging time may be determined according to the liquid crystal compound.

<<Ultraviolet (UV) Curing Step>>

After the aging step, ultraviolet curing is carried out in order to fix the alignment state of the molecules of the liquid crystal compound. In the ultraviolet curing step, a polymerization reaction by means of a photocation polymerizable group (photocation polymerization reaction) and a polymerization reaction by means of a photoradical polymerizable group (photoradical polymerization reaction) are carried out separately. According to the present specification, the coating film obtained after the first polymerization process between the two stages of polymerization in the ultraviolet curing step is referred to as semi-fixed liquid crystal film. The procedure of the curing step will be described.

1) Full-Face Exposure Step

The entire surface of the coating film 20B in a state of being oriented in a twisted liquid crystalline phase is irradiated with ultraviolet radiation at an exposure amount of 100 to 2,000 mJ/cm$^2$ in air, and thereby the entire surface of the coating film 20B is subjected to almost uniform exposure (S3). At this time, mainly cationic polymerization proceeds as a result of the action of the cationic polymerization initiator included in the coating film 20B. Meanwhile, it is still acceptable that radical polymerization has partially occurred. As a result of this full-face exposure, a portion is crosslinked (partial curing) over the entire surface, and thereby a semi-fixed liquid crystal film 20C in which the alignment state of the liquid crystal is semi-fixed is obtained. The term "semi-fixed" refers to a state in which the liquid crystal composition in the invention has lost fluidity, and refers to a state prior to a heat treatment step. For example, the term implies that only one side functional group of a bifunctional liquid crystal is crosslinked, and thereby a polymeric liquid crystalline state is achieved. In the case of a polymerizable liquid crystal compound including a cationic polymerizable group and a photoradical polymerizable group, the term refers to a state in which one of the cationic polymerizable group or the photoradical polymerizable group is selectively crosslinked. In the present full-face exposure step, the term refers to a state in which the cationic polymerizable group is selectively crosslinked; however, it is still acceptable that crosslinking by the photoradical polymerizable group has partially occurred.

2) Initiator Application Step

On the surface of the semi-fixed liquid crystal film 20C described above, an initiator supply liquid including a photoradical polymerization initiator is applied and dried.

3) Mask Exposure Step

Subsequently, in a state of having a predetermined mask 40 disposed on the semi-fixed liquid crystal film 20C, the semi-fixed liquid crystal film 20C is irradiated with ultraviolet radiation in an exposure amount of 30 to 100 mJ/cm$^2$ in air at room temperature, through a predetermined mask 40 (S4). In the predetermined mask 40, in order to obtain a first region and a second region in a desired pattern, an opening part 42 corresponding to the first region and a non-opening part 44 corresponding to the second region have been formed. Thereby, patterned exposure is achieved, by which a region exposed to the mask opening part 42 in the semi-fixed liquid crystal film 20C is exposed to light, and the part covered with the mask non-opening part 44 is not exposed to light. At this time, in the exposed region, photoradical polymerization induced by the action of the photoradical polymerization initiator proceeds.

<<Heat Treatment Step>>

The entire substrate including the semi-fixed liquid crystal film 20D and the support as obtained after the exposure step is heated for a predetermined time period at an isotropic phase formation temperature (temperature higher than or equal to the temperature for phase transition into an isotropic phase) of the liquid crystal compound (S5).

By means of this heat treatment, the liquid crystal forms an isotropic phase in the region that has not been subjected to mask exposure. The isotropic phase may be further stabilized by performing post-exposure after the heat treatment.

2Through the above-described processes, a depolarizing layer 20 in which the first region 21 formed from a twisted liquid crystalline phase and the second region 22 formed from an isotropic phase are formed into a pattern, can be obtained (S6).

In the above description, the case in which a cationic polymerizable group of a polymerizable liquid crystal compound having a cationic polymerizable group and a photoradical polymerizable group is polymerized first, and then the photoradical polymerizable group is polymerized, has been described; however, a depolarizing layer having a similar twisted phase and a similar isotropic phase can be formed also by the procedure of polymerizing the photoradical polymerizable group first and then polymerizing the cationic polymerizable group. In this case, regarding the polymerizable liquid crystal composition described above, it is desirable to use a liquid crystal composition including a photoradical polymerization initiator instead of a cationic polymerization initiator. Then, the photoradical polymerization initiator application step is not needed, and before cationic polymerization is carried out separately, a cationic initiator application step may be provided.

Next, elements other than the depolarizing layer among the elements that constitute the depolarizing film will be explained.

[Support]

The depolarizing film may include a support, and the support is preferably a transparent support. Examples include a film of a polyacrylic resin such as polymethyl methacrylate; a film of a cellulose-based resin such as cellulose triacetate; and a cycloolefin polymer-based film [for example, trade name "ARTON" manufactured by JSR Corporation, trade name "ZEONOR", manufactured by Zeon Corporation]. The support is not limited to a flexible film and may be a non-flexible substrate such as a glass substrate.

The depolarizing film in the invention may be used while being supported by the support used at the time of forming a film. Alternatively, the support used at the time of forming a film may be used as a temporary support, the depolarizing film may be transferred onto another support, and the depolarizing film may be used after the temporary support is detached.

[Oriented Film]

On the support for forming a liquid crystal layer, an oriented film may be provided. The oriented film can be provided by means of a rubbing treatment of an organic compound (preferably, a polymer), oblique vapor deposition of an inorganic compound, formation of a layer having microgrooves, and the like. Furthermore, an oriented film acquiring a function of orientation by means of impartation of an electric field, impartation of a magnetic field, or light irradiation is also known. It is preferable that the oriented film is formed by subjecting the surface of a film of a polymer to a rubbing treatment. In the case of using a depolarizing film after detaching from the support used at the time of film forming, it is preferable that the oriented film is detached together with the support.

In the case of using a support made of a resin, depending on the polymer type, the support can be made to function as an oriented film, even without providing an oriented film, by subjecting the support to a direct alignment treatment (for example, rubbing treatment). An example of such a support may be PET (polyethylene terephthalate).

[λ/4 Plate]

As described previously, a broadband λ/4 plate is preferred, and a commercially available λ/4 plate can be used as appropriate.

[Adhesive Layer (Pressure-Sensitive Adhesive Layer)]

According to the present specification, "adhesion" is used as a concept also including "pressure-sensitive adhesion".

The depolarizing layer 20 and the λ/4 plate 30 may be laminated with an adhesive layer interposed therebetween.

Examples of a pressure-sensitive adhesive used for the adhesive layer include resins such as a polyester-based resin, an epoxy-based resin, a polyurethane-based resin, a silicone-based resin, and an acrylic resin. These may be used alone, or two or more kinds thereof may be used as mixtures. Particularly, an acrylic resin is preferred from the viewpoint that the resin has excellent reliability such as water resistance, heat resistance, and light resistance, has satisfactory adhesive force and transparency, and can have the refractive index easily adjusted so as to suit liquid crystal displays.

EXAMPLES

Hereinafter, Examples and Comparative Examples of the depolarizing film in the invention will be described.

First, the production of various compositions used for the production of the depolarizing films of Examples and Comparative Examples will be described.

(Production of Oriented Film Composition B)

<Synthesis of Polymer for Oriented Film Composition>

Into a reaction vessel equipped with a stirrer, a thermometer, a dropping funnel, and a reflux cooling tube, 100 parts by mass of 2-(3,4-epoxycyclohexyl)ethyltrimethoxysilane, 500 parts by mass of methyl isobutyl ketone, and 10 parts by mass of triethylamine were introduced, and the mixture was mixed at room temperature.

Next, 100 parts by mass of deionized water was added dropwise from the dropping funnel to the solution in the reaction vessel over 30 minutes, and then a solution thus obtained was caused to react for 6 hours at 80° C. while being mixed under reflux. After completion of the reaction, an organic phase was extracted from the solution, and the organic phase was washed until the water that had been used to wash the organic phase became neutral with a 0.2 mass % aqueous solution of ammonium nitrate. Subsequently, the solvent and water were distilled off under reduced pressure, and thereby an epoxy group-containing polyorganosiloxane was obtained as a consistent transparent liquid.

This epoxy group-containing polyorganosiloxane was subjected to a $^1$H-NMR (Nuclear Magnetic Resonance) analysis, and a peak based on an oxilanyl group was obtained at a theoretical intensity at a chemical shift (δ)=near 3.2 ppm. Thus, it was confirmed that side reactions of epoxy groups did not occur during the reaction. The weight average molecular weight $M_w$ of this epoxy group-containing polyorganosiloxane was 2,200, and the epoxy equivalent was 186 g/mol.

Next, into a 100-mL three-necked flask, 10.1 parts by mass of the epoxy group-containing polyorganosiloxane obtained as described above, 0.5 parts by mass of an acrylic group-containing carboxylic acid (Toagosei Co., Ltd., trade name "ARONIX M-5300", ω-carboxypolycaprolactone acrylate (degree of polymerization n≈2)), 20 parts by mass of butyl acetate, 1.5 parts by mass of a cinnamic acid derivative obtained by the method of Synthesis Example 1 of JP2015-26050A, and 0.3 parts by mass of tetrabutylammonium bromide were introduced, and a reaction solution thus obtained was stirred for 12 hours at 90° C.

After completion of the reaction, the reaction solution was diluted with an equal amount (mass) of butyl acetate, and the dilution was washed with water three times.

An operation of concentrating the solution thus obtained and diluting the concentration with butyl acetate was repeated two times, and finally, a solution including a polyorganosiloxane (polymer) having a photo-alignable group was obtained. The weight average molecular weight $M_w$ of this polymer was 9,000. As a result of a $^1$H-NMR analysis, the proportion of the component having a cinnamate group in the polymer was 23.7% by mass.

<Production of Oriented Film Composition B>

Butyl acetate was used as a solvent, and the polymer produced previously and the following compound D1 and compound D2 were added thereto in the following amounts. Thus, oriented film composition B was produced.

| Oriented film composition B (parts by mass) | |
|---|---|
| Butyl acetate | 100 |
| Polymer for oriented film composition | 4.35 |
| Compound D1 | 0.48 |
| Compound D2 | 1.15 |

| Oriented film composition B (parts by mass) |
|---|
| ![D1 structure: Al with three acetylacetonate ligands] |
| D1 |
| ![D2 structure: triphenylsilanol] |
| D2 |

(Production of Polymerizable Liquid Crystal Composition LC-2)

After the following composition was produced, the composition was filtered through a filter made of polypropylene and having a pore size of 0.2 μm, and the resultant was used as polymerizable liquid crystal composition LC-2.

A rod-shaped liquid crystal (LC-1-1) was synthesized based on the method described in JP2004-12382A. The rod-shaped liquid crystal (LC-1-1) is a liquid crystal compound having two reactive groups, and one of the two reactive groups is an acryl group, which is a radical reactive group, while the other is an oxetane group, which is a cationic reactive group. A horizontal alignment agent (LC-1-2) was synthesized according to the method described in Tetrahedron Lett., Vol. 43, page 6793 (202).

| Polymerizable liquid crystal composition LC-2 (parts by mass) | |
|---|---|
| Rod-shaped liquid crystal (LC-1-1) | 19.57 |
| Horizontal alignment agent (LC-1-2) | 0.01 |
| Chiral agent having the following structure | 0.035 |
| Cationic monomer (OXT-121, manufactured by Toagosei Co., Ltd.) | 0.98 |
| Cationic polymerization initiator | 0.4 |
| (Curacure UV16974, manufactured by Dow Chemical Company) | |
| Polymerization controlling agent | 0.02 |
| (IRGANOX 1076, manufactured by BASF SE) | |
| Methyl ethyl ketone | 80.0 |

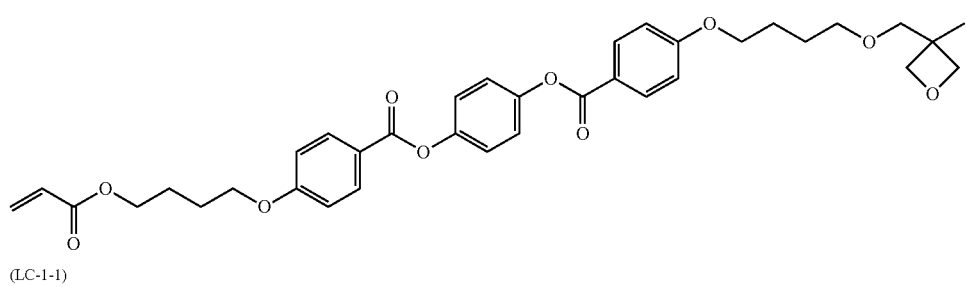

(LC-1-1)

-continued

Polymerizable liquid crystal composition LC-2 (parts by mass)

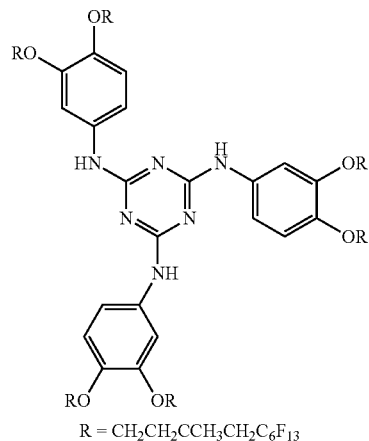

R = CH₂CH₂CCH₃CH₂C₆F₁₃

(LC-1-2)
Chiral agent

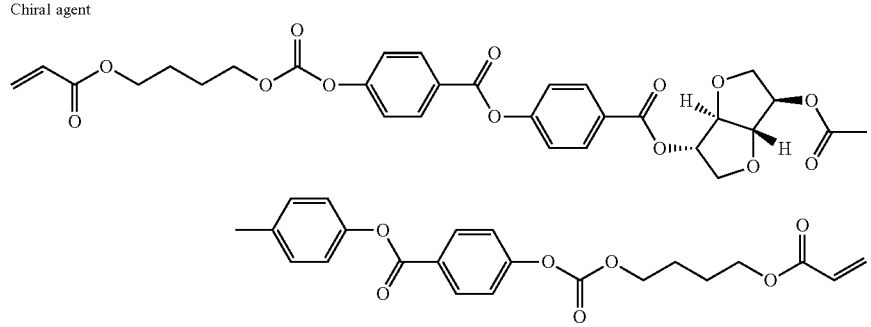

35

(Production of Initiator Supply Liquid AD-1)

The following composition was produced, and then the composition was filtered through a filter made of polypropylene and having a pore size of 0.2 μm. Thus, the resultant was used as an initiator supply liquid AD-1.

| Initiator supply liquid AD-1 (parts by mass) | |
| --- | --- |
| Photoradical polymerization initiator (2-trichloromethyl-5-(p-styrylstyryl)-1,3,4-oxadiazole) | 0.12 |
| Hydroquinone monomethyl ether | 0.002 |
| MEGAFAC F-176PF (manufactured by DIC Corporation) | 0.05 |
| Propylene glycol monomethyl ether acetate | 34.80 |
| Methyl ethyl ketone | 50.538 |
| Methanol | 1.61 |

Example 1

The production of the depolarizing film of Example 1 was carried out by the following procedure.

<Formation of Oriented Film>

The oriented film composition B produced as described above was uniformly applied on a glass substrate using a slit coater and then was dried in an oven at 100° C. for 2 minutes. Thus, an oriented film-attached glass substrate having a film thickness of 0.5 μm was obtained. This oriented film was subjected to a rubbing treatment in a direction parallel to the direction of application.

<Formation of Depolarizing Layer>

The polymerizable liquid crystal composition LC-2 was applied on the rubbing-treated surface of the oriented film, and a coating film was formed (coating step).

Next, the coating film was heated and aged for 60 seconds at a film surface temperature of 80° C., and the coating film was oriented in a twisted liquid crystalline phase (aging step).

Thereafter, immediately, the entire surface of the coating film was irradiated with ultraviolet radiation at a dose of 500 mJ/cm² using an air-cooled metal halide lamp (manufactured by Eye Graphics Co., Ltd.) in air at a film surface temperature of 70° C., and full-face exposure was carried out (UV curing step: full-face exposure step). Photocationic polymerization was carried out, and the alignment state was semi-fixed. Thereby, a semi-fixed liquid crystal film was formed.

On the semi-fixed liquid crystal film obtained in this manner, the initiator supply liquid AD-1 produced as described above was applied and dried at 80° C. for 60 seconds (UV curing step: initiator application step).

Subsequently, the semi-fixed liquid crystal film was exposed by irradiating the film with ultraviolet radiation through a predetermined mask in an exposure amount of 50 mJ/cm² in air at 25° C. using a PLA-501F exposure machine (ultrahigh pressure mercury lamp) manufactured by Canon, Inc. (UV curing step: mask exposure step), and photoradical polymerization in an exposed region (mask opening region) was carried out. The predetermined mask was such that opening parts and non-opening parts were disposed alternately at a period of 10 μm, that is, opening parts having a width of 5 μm and non-opening parts having a width of 5 μm were alternately formed into stripe shapes.

Subsequently, the entire substrate including the mask-exposed semi-fixed liquid crystal film was fired in an oven at 200° C. for 30 minutes (heat treatment step), and a depolarizing layer having a first region and a second region was obtained.

In this manner, a depolarizing film of Example 1 was produced.

It was confirmed that the UV-irradiated first region, which corresponded to the opening region of the mask, was a region having the liquid crystal layer twisted by 90° and having a function of achieving 90° optical rotation, while the second region that was not irradiated with UV, which corresponded to the non-opening region of the mask, lost birefringence of the liquid crystal layer and became an optically isotropic region.

The depolarizing layer thus completed was cut to expose a cross-section, and the film thickness was measured from a SEM image. Measurement was carried out at a plurality of sites such as three or more sites, and the average value was designated as the film thickness of the depolarizing layer. The film thickness of the depolarizing layer thus obtained was 3 µm.

Example 2

The depolarizing film of Example 1 was bonded together with a λ/4 plate that had been prepared separately, and the resultant was used as a depolarizing film of Example 2.

As the λ/4 plate, a broadband wavelength plate, B-RE-TAX-1/4λ-30, of Luceo Co., Ltd. was used. The in-plane retardation Re (λ) and the thickness-direction retardation Rth (λ) at a wavelength λ of the film of the broadband wavelength plate were Re (550)=125 nm and Rth (550)=1 nm, respectively. The depolarizing film of Example 1 and the λ/4 plate were bonded together using a pressure-sensitive adhesive (SK-2057, manufactured by Soken Chemical & Engineering Co., Ltd.).

Comparative Example 1

A depolarizing film in which a first region formed from a λ/2 plate and a second region formed from an optically isotropic member were alternately disposed was produced by referring to JP2006-047421A.

[Evaluation]

For the various depolarizing films, linearly polarized light or circularly polarized light was made incident, and the degree of depolarization was measured.

(Method for Measuring Degree of Depolarization)

The degree of depolarization was measured using an elliptical polarization analyzer KOBRA-WPR of Oji Scientific Instruments Co., Ltd. and using a PR software program for elliptical polarization analysis and a TR software program for transmittance measurement of the same company.

For the depolarizing film of each example, a sample for measurement that measured 20 mm on each side was produced and submitted to measurement. The samples of Example 1 and Comparative Example 1 were irradiated with an incident ray as linearly polarized light in a 5-mmφ (diameter) circular region, and the degree of depolarization was measured. Subsequently, in the apparatus, the polarizing axis of the incident ray was shifted by 45° each time, the initial measurement was set at 0° ($P_0$), and the angle of the polarizing axis of the incident ray was changed to 45° ($P_{45}$), 90° ($P_{90}$), and 135° ($P_{135}$). The degree of depolarization of each depolarizing film was measured. Furthermore, for the sample of Example 2, circularly polarized light was used as an incident ray, and the degree of depolarization was measured. At this time, measurement was carried out respectively for left-handed circularly polarized light and right-handed circularly polarized light.

The wavelength of the incident ray was set at 550 nm. Meanwhile, the same measurement was carried out even at wavelengths other than 550 nm (450 nm and 630 nm), and the results were approximately the same as that for 550 nm. Here, the results obtained at 550 nm will be shown as representative results.

(Evaluation Criteria)

The degree of depolarization thus measured was evaluated according to the following criteria.

A: higher than 95%
B: higher than 90% and 95% or lower
C: higher than 50% and 90% or lower
D: 50% or lower The configurations and evaluation results of the various examples are shown together in Table 1.

TABLE 1

| | | | EXAMPLE 1 | EXAMPLE 2 | COMPARATIVE EXAMPLE 1 |
|---|---|---|---|---|---|
| Configuration of depolarizing film | Depolarizing layer | First region | Twisted liquid crystalline phase | Twisted liquid crystalline phase | λ/2 plate |
| | | Second region | Isotropic phase | Isotropic phase | Transparent material (optical isotropy) |
| | λ/4 plate | | Absent | Present | Absent |
| Degree of depolarization | Incident ray: linearly polarized light Polarizing axis $P_0$ | | A | — | D |
| | Incident ray: linearly polarized light Polarizing axis $P_{90}$ | | A | — | D |
| | Incident ray: linearly polarized light Polarizing axis $P_{45}$ | | A | — | A |
| | Incident ray: linearly polarized light Polarizing axis $P_{135}$ | | A | — | A |
| | Incident ray: circularly polarized light Left-handed circularly polarized light $P_L$ | | — | A | — |
| | Incident ray: circularly polarized light Right-handed circularly polarized light $P_R$ | | — | A | — |

As shown in Table 1, the depolarizing film of Example 1 could realize satisfactory depolarization irrespective of the angle of the polarizing axis in a case in which the incident ray was linearly polarized light. The depolarizing film of Example 2 could realize satisfactory depolarization in a case in which the incident ray was circularly polarized light. Since Comparative Example 1 used a λ/2 plate, satisfactory depolarization could be realized for linearly polarized light having a polarizing axis inclined by 45° or 135° with respect to the slow axis of the λ/2 plate; however, with polarizing axes at different inclinations, the effect of depolarization was hardly obtained. From the results of Examples 1 and 2, it is speculated that in a case in which a depolarizing member is constructed by superposing these depolarizing films of Examples 1 and 2, satisfactory depolarization can be realized for both linearly polarized light and circularly polarized light.

EXPLANATION OF REFERENCES 1, 2: depolarizing film
1a, 2a: one surface of depolarizing film
1b, 2b: the other surface of depolarizing film
5: depolarizing member
5a: one surface of depolarizing member
5b: the other surface of depolarizing member
10: support
20, 120, 220: depolarizing layer
20A: coating film
20B: coating film oriented in twisted liquid crystalline phase
20C: semi-fixed liquid crystal film
21, 121, 221: first region
22, 122, 222: second region
30: λ/4 plate
40: mask
42: opening
44: non-opening

What is claimed is:

1. A depolarizing member including two depolarizing films and a λ/4 plate, the depolarizing films being disposed such that respective depolarizing layers thereof face each other, with the λ/4 plate interposed therebetween, wherein:
   each depolarizing film includes a depolarizing layer comprising a first region and a second region having differing optical characteristics,
   in each depolarizing layer, a ratio between an area of the first region and an area of the second region is 0.45:0.55 to 0.55:0.45,
   the first region is an optically anisotropic region causing 90° optical rotation of light that is incident on one surface of the depolarizing layer and is emitted from another surface, and
   the second region is an optically isotropic region having optical isotropy.

2. The depolarizing member according to claim 1, wherein the first region is formed by immobilizing a liquid crystalline phase that is oriented with a 90° twist between the one surface and the other surface of the depolarizing layer.

3. The depolarizing member according to claim 2, wherein the second region is formed from an isotropic phase formed by the same liquid crystal material as the liquid crystal material that constitutes the first region.

* * * * *